United States Patent
Carey et al.

(10) Patent No.: US 6,574,639 B2
(45) Date of Patent: *Jun. 3, 2003

(54) QUERY OPTIMIZATION WITH DEFERRED UPDATES AND AUTONOMOUS SOURCES

(75) Inventors: Michael James Carey, San Jose, CA (US); Gerald George Kiernan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/891,453

(22) Filed: Jun. 27, 2001

(65) Prior Publication Data

US 2001/0049685 A1 Dec. 6, 2001

Related U.S. Application Data (63) Continuation of application No. 09/192,817, filed on Nov. 16, 1998.

(51) Int. Cl.[7] .............................................. G06F 17/30
(52) U.S. Cl. .................................................. 707/104.1
(58) Field of Search ........................ 707/2, 4, 10, 101, 707/103 R, 201, 203; 709/201, 203

(56) References Cited

U.S. PATENT DOCUMENTS

| | | | |
|---|---|---|---|
| 5,241,669 A | 8/1993 | Cohn et al. | 395/575 |
| 5,353,410 A | 10/1994 | Macon, Jr. et al. | 395/275 |
| 5,615,362 A | 3/1997 | Jensen et al. | 707/103 |
| 5,706,506 A | 1/1998 | Jensen et al. | 707/103 |
| 5,778,355 A | 7/1998 | Boyer et al. | 707/2 |
| 5,897,634 A | 4/1999 | Attaluri et al. | 707/8 |
| 5,905,982 A | 5/1999 | Carey et al. | 707/4 |
| 6,006,214 A | 12/1999 | Carey et al. | 707/2 |
| 6,012,085 A | 1/2000 | Yohe et al. | 709/217 |
| 6,078,926 A | 6/2000 | Jensen et al. | 707/103 |
| 6,122,627 A | 9/2000 | Carey et al. | 707/4 |
| 6,134,540 A | 10/2000 | Carey et al. | 707/2 |
| 6,243,710 B1 * | 6/2001 | DeMichiel et al. | 707/10 |
| 6,285,997 B1 * | 9/2001 | Carey et al. | 707/103 R |

OTHER PUBLICATIONS

Zaharioudaki et al., "Hierarchical Adaptive Cache Consistency in a Page Server OODMBS," IEEE Transactions on Computers, v. 47, No. 4, pp. 427–444, Apr. 1998.
Gardarin et al., "Extending a Relational DBMS to Support Complex Objects," IEEE, 1989, pp. 131–137.
Bober et al., "On Mixing Objects and Transactions via Multiversion Locking," IEEE, 1992, pp. 535–545.
Arthur M. Keller and Julie Basu, "A predicate–based caching scheme for client–server database architectures," The VLDB Journal 5:35–47 (1996).
Michael J. Franklin et al., "Performance Tradeoffs for Client–Server Query Processing," ACM SIGMOD Conf., Montreal, pp. 149–160 (1996).
Shaul Dar et al., "Semantic Data Caching and Replacement," Proceedings of the $22^{nd}$ VLDB Conference, Mumbai (Bombay), India, pp. 330–341 (1996).
Cammarata, S., "Deferring Updates in a Relational Data Base System" (Abstract), Rand Corp., 1 page (1981).

* cited by examiner

*Primary Examiner*—Diane D. Mizrahi
*Assistant Examiner*—Apu Mofiz
(74) *Attorney, Agent, or Firm*—Sughrue Mion, PLLC (57) ABSTRACT

A method, apparatus, and article of manufacture for a computer-implemented technique for query optimization with deferred updates and autonomous sources. An object-oriented query is executed to retrieve data from a database. The database is stored on a data storage device connected to a computer. The object-oriented query is transformed into subqueries, wherein at least one subquery is directed against a database, and wherein one subquery is directed against an object cache. Each subquery that is directed against a database is executed to retrieve data from the database into the object cache. The subquery that is directed against the object cache is executed to retrieve data for the query, wherein the data incorporates updates to the object cache and updates to the database.

36 Claims, 3 Drawing Sheets

QUERY OPTIMIZATION WITH DEFERRED UPDATES AND AUTONOMOUS SOURCES

This is a continuation of application Ser. No. 09/192,817, filed Nov. 16, 1998.

BACKGROUND OF THE INVENTION

1. Field of the Invention

This invention relates in general to computer-implemented database systems, and, in particular, to query optimization with deferred updates and autonomous sources.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

The integration of object technology and database systems has been an active area of research for the past decade. One important aspect of the integration of these two technologies is the provision of efficient, declarative query interfaces for accessing and manipulating object data. Compared to other aspects of object-oriented database ("OODB") technology, such as integrating persistence into object-oriented languages (e.g., C++ and Smalltalk), queries were given relatively little attention in the early days of OODB research, which is further described in Mike Stonebraker, *Third-Generation Data Base System Manifesto*, Computer Standards & Interfaces, Dec. 12, 1991, which is incorporated by reference herein. In Won Kim, *Object-Oriented Database Systems: Promise, Reality, and Future*, Proc. 19th International Conference on Very Large Data Bases, Dublin, August 1993, which is incorporated by reference herein, it is pointed out that commercial OODB systems are weak in this regard.

However, a number of proposals for OODB query languages have appeared in the database literature. See Mike Carey, David DeWitt, and Scott Vandenberg, *A Data Model and Query Language for EXODUS*, Proc. ACM-SIGMOD International Conference on Management of Data, Chicago, June 1988; Won Kim, *A Model of Queries For Object-Oriented Databases*, Proc. 15th International Conference on Very Large Data Bases, Amsterdam, August 1989; Francois Bancilhon, S. Cluet, and C. Delobel A, *Query Language for the $O_2$ Object-Oriented Database System*, edited by Richard Hull, Ron Morrison, and David Stemple, Proc. 2nd International Workshop on Database Programming Languages, Gleneden Beach, Morgan-Kaufmann Publishers, Inc., June 1989 [hereinafter "Bancilhon et al."]; Jack Orenstein, Sam Haradhvala, Benson Margulies, and Don Sakahara, *Query Processing in the ObjectStore Database System*, Proc. ACM-SIGMOD International Conference on Management of Data, San Diego, June 1992, [hereinafter "Orenstein et al."]; S. Dar, N. Gehani, and H. Jagadish, *CQL++: A SQL for a C++ Based Object-Oriented DBMS*, Proc. International Conference on Extending Data Base Technology, Advances in Database Technology—EDBT '92, Lecture Notes in Computer Science, Vienna, Springer-Verlag, 1992; Michael Kifer, Won Kim, and Yehoshua Sagiv, *Querying Object-Oriented Databases*, Proc. ACM-SIGMOD International Conference on Management of Data, San Diego, June 1992; Tom Atwood, Joshua Duhl, Guy Ferran, Mary Loomis, and Drew Wade, *Object Query Language*, edited by R. G. G. Cattell, Object Database Standards: ODMG-93 Release 1.1 Morgan-Kaufmann Publishers, Inc., 1993, [hereinafter "Atwood et al."]; José Blakeley, William J. McKenna, and Goetz Graefe, Experiences Building The Open OODB Query Optimizer, Proc. ACM-SIGMOD International Conference on Management of Data, Washington D.C., May 1993; each of which is incorporated by reference herein. While proposals outnumber actual implementations, several of these language designs have indeed been implemented as the query interfaces for significant commercial OODB products, which is discussed in Bancilhon et al. and Orenstein et al.

The commercial OODB systems that are generally considered to have good object query facilities, O2, which is discussed in Bancilhon et al., and ObjectStore, which is discussed in Orenstein et al., each provide their own flavor of object query language. ObjectStore's query language is an extension to the expression syntax of C++. O2's query language is generally more like SQL and has been adapted into a proposed OODB query language standard (i.e., the ODMG-93 proposal) by a consortium of OODB system vendors, which is discussed in Atwood et al., but it differs from SQL in a number of respects, which is discussed further in Won Kim, *Observations on the ODMG-93 Proposal*, ACM SIGMOD Record, 213(1), March 1994, which is incorporated by reference herein.

Query rewrite transformations have been developed for relational DBMSs. See Hamid Pirahesh, Joseph M. Hellerstein, and Waqar Hasan, *Extensible/Rule Based Query Rewrite Optimization in Starburst*, Proc. ACM-SIGMOD International Conference on Management of Data, San Diego, June 1992; Inderpal Singh Mumich, Sheldon J. Finkelstein, Hamid Pirahesh, and Raghu Rarnakrishnan, *Magic is Relevant*, Proc. ACM-SIGMOD International Conference on Management of Data, pages 247–258, Atlantic City, May 1990; Inderpal Singh Mumick, Hamid Pirahesh, and Raghu Ramakrishnan, *The Magic of Duplicates and Aggregates*, Proc. 16th International Conference on Very Large Data Bases, Brisbane, August 1990; each of which is incorporated by reference herein.

Many of these transformations also apply for Object Query Systems. However, new query rewrite transformations that apply specifically to Object Query Systems need to be developed, as discussed in Sophie Cluet and Claude Delobel, *A General Framework for the Optimization of Object-Oriented Queries*, Proc. ACM-SIGMOD International Conference on Management of Data, San Diego, June 1992, which is incorporated by reference herein. Predicate pushdown, which is a query rewrite transformation, is the notion of taking a query and determining which parts of the query can be migrated through the layers of the schema to the databases where the data resides. The objective is to use the power of the database query function to do data filtering, and, thereby, restrict the amounts of data that have to be transferred from the database servers to clients.

Predicate pushdown can include all of the predicates that define a query's result, in which case the task of restricting the result set is entirely performed by the databases where the data resides. Predicate pushdown can include partial predicates that define a query's results, in which case some of the predicates (e.g., a subset of the conjuncts that define a query's result) are passed down to the databases where the data resides, thereby restricting the results returned by these databases. The remaining predicates that could not be pushed down are then applied in object space by the query evaluator. Finally, if predicate pushdown cannot be applied, the predicates that define a query's results must be applied in object space after having retrieved the complete sets of data referenced in the query.

Semi-join techniques for distributed query processing have been presented in Clement T. Yu and C. C. Chang, *Distributed Query Processing*, ACM Computing Surveys, 16(4):399–433, December 1984, [hereinafter "Yu et al."], which is incorporated by reference herein. Similarly, to join queries, semi-join queries involve multiple tables and have predicates that establish a relationship among the tables participating in a query. However, only a subset of the tables are referenced in the projection clause of a semi-join query.

The following optimization is presented in Yu et al. Given two remote tables $T_1$ and $T_2$ participating in a join, if each table is managed by a different remote DBMS, results corresponding to table $T_i$ are first retrieved. Results corresponding to a table $T_j$, $j \neq i$ are then retrieved by selecting those results where the join column values of $T_j$ are in the list of join column values of results retrieved from table $T_i$. This procedure is especially interesting if there is one or more additional predicates only involving $T_i$ that can be used to initially restrict the first result.

Query evaluation using a client cache is presented in Shaul Dar, Michael J. Franklin, Björn T. Jónsson, Divesh Srivastava, and Michael Tan, *Semantic Data Caching and Replacement*, Proc. 22nd International Conference on Very Large Data Bases, Mumbai, August 1996, [hereinafter "Dar et al."], which is incorporated by reference herein. Dar et al. focuses on determining whether a query can be resolved from the client cache alone or whether a partial query result can be obtained from the client cache with the remaining result drawn from the database server. The technique that is used for query evaluation is predicated on maintaining a semantic description of the client cache content. For a given table, the semantic description is a constraint that is dynamically modified to include new cache entries. For example, if a query initially retrieves all employees having a salary between 50,000 and 100,000, the constraint describing the cache content for the employee table is sal$\geq$50000 and sal$\leq$100000. If a subsequent query requests employees having a salary between 60,000 and 80,000, that query result can be drawn from the cache alone. A similar approach called predicate-based caching is presented in Arthur M. Keller and Julie Basu, *A Predicate-Based Caching Scheme for Client-Server Database Architectures*, The VLDB Journal, 5:35–47, 1996, which is incorporated by reference herein.

The performance tradeoffs of query shipping versus data shipping are presented in Michael J. Franklin, Björn Thór Jónsson, and Donald Kossmann, *Performance Tradeoffs for Client-Server Query Processing*, Proc. ACM-SIGMOD International Conference on Management of Data, Montreal, June 1996, which is incorporated by reference herein. Query shipping is described as the relational DBMS client-server environment in which a query is passed from the client to the server, and the work of query evaluation is done on the server. The object-oriented DBMS client-server environment is coined data shipping because data pages or objects are transferred from the server to the client where most of the processing takes place (e.g., navigational data access). Hybrid shipping is proposed to combine the advantages of both query shipping and data shipping.

Therefore, there is a need in the art to extend the previous systems in a middleware system with an object cache connected to a database. Furthermore, there is a need in the art for an improved technique for query optimization with deferred updates and autonomous sources.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented technique for query optimization with deferred updates and autonomous sources.

In accordance with the present invention, an object-oriented query is executed to retrieve data from a database. The database is stored on a data storage device connected to a computer. The object-oriented query is transformed into subqueries, wherein at least one subquery is directed against a database, and wherein at least one subquery is directed against an object cache. Each subquery that is directed against a database is executed to retrieve data from the database into the object cache. Each subquery that is directed against the object cache is executed to retrieve data for the query, wherein the data incorporates updates to the object cache and updates to the database.

An object of the invention is the provision of object query access for object views of heterogeneous databases that can include relational databases. Another object of the invention is to retrieve data in response to an object-oriented query, while taking into account differences between data in an object cache and in a database.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

A. Query Optimization With Deferred Updates And Autonomous Sources

The DECAF System of the present invention provides a query optimization technique for an object query system with an object cache supporting deferred updates to underlying databases. The DECAF optimization is designed to work correctly in the presence of updates to the underlying databases that do not go through the object cache (i.e., updates performed directly against the databases by other transactions). The DECAF optimization query results are consistent with updates performed by such transactions. The DECAF optimization query results are also consistent with any deferred updates present in the object cache. The DECAF optimization attempts to push down query predicates to the underlying DBMS to take advantage of the query processing capabilities of these systems and to reduce the amount of data transferred from these systems to the object cache.

The DECAF optimization provides object query access for object views of heterogeneous databases that can include relational databases. An object cache of view objects provides an object-oriented DBMS ("OODBMS") look and feel for applications requiring access to legacy data backed by existing DBMSs. The object query language is SQL-92 with object extensions as described in Jerry Kiernan and Mike Carey, *Extending SQL-92 for QQDB Access: Design and Implementation Experience*, Proc. Conference on Object-Oriented Programming Systems, Languages, and Applications, Austin, October 1995, [hereinafter "Kiernan et al."], which is incorporated by reference herein.

In contrast to the ObjectStore, O2, and ODMG-93 query interfaces, the goal of the DECAF optimization is to support an OODB query interface that provides an upward compatible extension to SQL-92, which is described in ISO_ANSI, Database Language SQL ISO/IEC 9075:1992, 1991, which is incorporated by reference herein. The motivation for the approach of the query language is twofold. First, it enables programmers familiar with SQL to write OODB queries without learning an entirely new language; they must simply learn about the query language's object extensions. Second, it enables the many tools that have been built for relational systems to access OODB data via interfaces such as ODBC, which is described in Microsoft, Programmer's Reference, Microsoft Open Database Connectivity Software Development Kit, 1992, and which is incorporated by reference herein.

The DECAF optimization differs from the optimization presented in Yu et al. for distributed query processing. In particular, distributed query processing techniques handle data that are partitioned across multiple remote databases. In contrast with distributed query processing techniques, the DECAF optimization handles queries using an object cache which contains a partial and possibly inconsistent replica of data retrieved from one or more remote databases.

Unlike the DECAF optimization, current semantic cache management techniques, such as those described in Dar et al., are appropriate only for simple queries and don't address the problem of recognizing updates made by other transactions to the underlying DBMSs.

1. DECAF System Overview

The DECAF optimization presents a query optimization technique to provide consistent answers to queries over object views using an object cache with deferred updates.

RDBMSs exploit a client-server run-time model in which a query and a query result (i.e., in the form of rows) are the main elements of the protocol between the client application and the database server. While results are returned to the application, caching (i.e., buffering) is performed on the server and new results are computed at the server, disregarding any previous result that the client application might have received. Object-oriented DBMSs ("OODBMSs") also use a client-server run-time model. In contrast with RDBMSs, OODBMSs generally perform their work, including query evaluation, on the client cache. In some OODBMSs, the server is merely a page server that responds to page requests from the client cache. In other OODBMSs, the server is an object server, sending individual objects or logical groups of objects to the client.

The DECAF optimization has query capabilities that present an object-oriented view of data managed by DBMSs, which can include RDBMSs. The object-oriented view is maintained with an object cache of data retrieved from DBMSs. The object cache contains a subset of the DBMS data and corresponds to data being manipulated by client applications. The object cache can also contain updates that need not necessarily be immediately propagated back to their target DBMSs. For example, for efficiency reasons, updates from the object cache to the target DBMSs may not be performed until the client issues a transaction commit. Object queries are expressed against object views maintained by the object cache. Query rewrite optimizations are used to transform queries expressed against the object model into equivalent queries expressed against target databases, thereby utilizing the query capabilities of these systems and limiting the amount of data transferred between the database server and the object cache. However, client query results need to be consistent with the target databases and with the deferred updates present in the object cache.

The techniques used to resolve views in relational DBMSs have been extended and adapted to object views. Query rewrite techniques are used to resolve object queries over views which can have multi-valued view columns, instance view columns, and path expressions that traverse view columns. To preserve the distinction between classes and collections that is found in many OODBMSs and Object-Oriented Systems ("OOSs"), the notion of view type is introduced. A single view type can be used for multiple views, multi-valued view columns, and/or instance view columns, which is further discussed in Kiernan et al. In particular, a collection refers to a collection of objects. An object is instantiated from a class.

Object-oriented DBMSs offer a seamless integration of application types and database types. In contrast with queries over relational databases, which return values that correspond to attributes in the rows of tables, queries over object-oriented databases can return handles to application objects as query results. Returning handles on application objects is a problem for queries over views. Views are understood by the query engine, but usually have no representation as application types. The problem of rendering application objects from views and view types is referred to as object building. Object building is further described in "A System, Method, and Program for Object Building in Queries over Object Views", application Ser. No. 08/853,976, filed on May 9, 1997, by Gerald G. Kiernan, et al., which is incorporated by reference herein. Object building is performed under the control of the query engine during query evaluation. There are two classes of queries that are affected by object building: 1) queries that return view types as query results and 2) queries that invoke methods on view types.

An object cache is used to preserve the object-oriented notion of identity, which states that two objects are the same if they have the same internal identifier. For example, in C++, memory location determines identity (i.e., an object is uniquely identified by its location in the memory). Some OODBs (e.g., O2, which is described in O. Deux et al., *The Story of O2*, IEEE Transactions on Knowledge and Data Engineering, 2(1), March 1990 and which is incorporated by reference herein) use an Object Identifier (OID) to maintain unique references to objects. The OID can either be a logical identifier independent of storage location or a physical identifier pointing to some storage area.

For the DECAF optimization, objects are retrieved from the underlying databases and added to the object cache. A key is used to determine whether an object is already resident in the object cache. A key is derived from one or more members of a type. If the object is found in the object cache, the cached copy of the object is used. If the object is not found in the object cache, a cached copy is created and added to the cache. Thereafter, the object's internal identifier (e.g., cache address) can be used by the client application to reference the object.

2. DECAF Environment

This section provides a brief overview of an environment in which the DECAF optimization of the present invention may be used. Since a focus of the DECAF optimization is directed to objects of view types that are based upon relational tables or other database structures, this section also reviews object views and view types.

2.1 Run-Time Caching Environment

Figure 1:
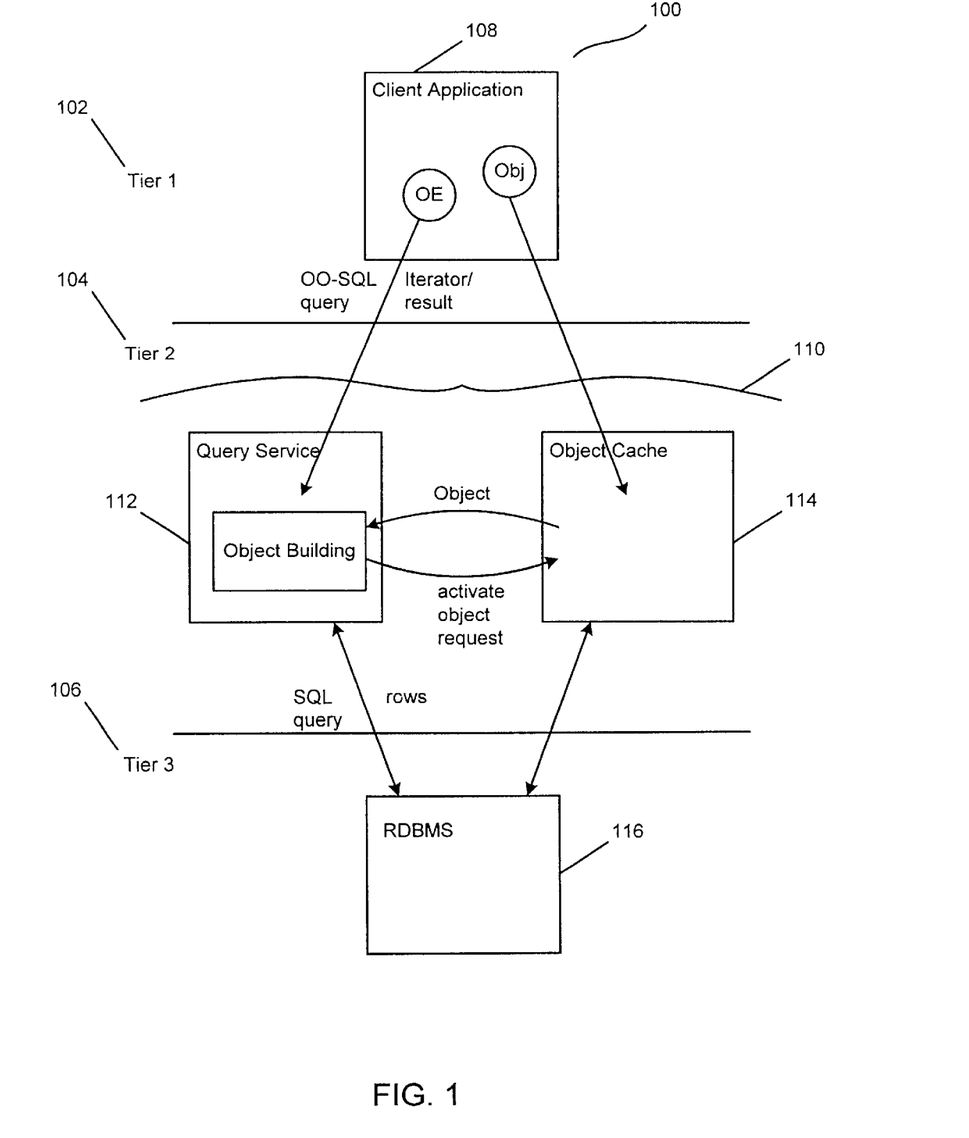
FIG. 1 is a diagram illustrating a three tier run-time environment that may be used for the present invention in accordance with a preferred embodiment.

FIG. 1 is a diagram illustrating a three tier run-time environment that may be used for the present invention in accordance with a preferred embodiment. Three tier environments arose from the more common two tier, or client-server, environments. In FIG. 1, the three tiers 102, 104, and 106 may be separate systems connected by a network. In the alternative, the three tiers 102, 104, and 106 may reside on one system. Similarly, the system could be equally adapted to a two tier environment in which the first and the second tier are combined.

In the three tier environment, what was referred to as the "client" in a two tier environment is essentially divided into two tiers: the client application 108 contained on tier 1 102 and the business object server 110, which contains the business logic common to several client applications, on tier 2 104. Tier 3 contains the backend database server 116, for example, a RDBMS.

The focus of tier 2 104 is to present the data contained at tier 3 106 as business objects, which are best suited for the needs of applications, thereby factoring out a percentage of the business logic that would otherwise be replicated across client applications. The business object server 110 comprises a query service 112 for handling queries from the client application 108 and an object cache 114 for storing a portion of data retrieved from the RDBMS 116. The data in the object cache 114 can be modified directly in the object cache 114.

In particular, the client application 108 at tier 1 102 obtains a handle on a query evaluator ("QE"), which can then be used to submit queries to and retrieve query results from the business object server 110 at tier 2 104. Query results that are references to objects are managed by the tier 2 104 object cache 114. The client application 108 can also get a handle to an object and operate on the object (e.g., with C++ methods) or obtain values of the objects (e.g., names of employees maintained in an employee object).

The following discussion focuses on two transaction environments: a Serializable Repeatable Read environment and an Optimistic Locking with Read-Committed environment.

In a serializable repeatable read environment, when a transaction requires data from the RDBMS 116 to be retrieved into an object cache 114, the transaction maintains a lock on the RDBMS 116 for the data retrieved for the duration of the transaction. That is, other transactions are prevented from accessing the data used by the RDBMS 114 until the transaction commits. Therefore, when a client transaction on tier 1 102 has a private cache in the object cache 114 on tier 2 104 that contains objects that have been retrieved from a tier 3 106 database 116 on its behalf, the cached objects on tier 2 104 that have been retrieved since the transaction began are consistent with the database 116 on tier 3 106 for the duration of the transaction.

There is a one-to-one correspondence between a client transaction managed by tier 2 104 and the corresponding database transaction managed by tier 3 106. The tier 2 104 object cache 114 can defer updates to tier 3 106 RDBMS 114 until the end of a transaction. Furthermore, the contents of the object cache 114 on tier 2 104 may or may not be retained beyond the end of a transaction.

In an optimistic locking with read-committed environment, a transaction does not hold a lock on the RDBMS 116 while writing data back to the RDBMS 116. Therefore, possible updates made to the RDBMS 116 during the duration of the transaction are determined before updating the RDBMS 116. Additionally, the original data retrieved from the RDBMS 116 is maintained, and the original data is compared to the RDBMS 116 data when the transaction is ready to write updates to the RDBMS 116. In this manner, any modifications that occurred to the RDBMS 116 during the duration of the transaction are identified.

The tier 2 104 object cache 114 is shared among the N client applications that are using the business object server 110. The business object server 110 on tier 2 104 maintains a level of isolation based upon serializable repeatable reads among its client transactions.

The level of isolation kept between the tier 2 104 business object server 110 and the tier 3 106 RDBMS 116 is read-committed. That is, only committed updates will be retrieved from tier 3 106 into the object cache 114. However, the retrieval of objects from tier 3 106 may be done at a lower consistency level than serializable repeatable read, and tier 3 106 locks are not retained for the duration of the client transaction. Updates made to the object cache 114 are deferred until the end of the client transaction, and a separate tier 3 106 RDBMS transaction is created to apply the updates at the end of a client transaction. The update transaction will abort if an updated object in the cache has changed in the tier 3 106 database 116 since the object was last read into the tier 2 104 object cache 114. For example, if an employee E's salary was 10,000 when it was read into the object cache 114 but is found to be 12,000 when the deferred update transaction runs, the transaction is aborted and updates are not made.

Objects that are retrieved into the object cache 114 from tier 3 104 after the client transaction began are not refreshed until the client transaction ends. That is, if the same object is retrieved twice during the course of a client transaction with different values, the initial values are maintained. Since the object cache 114 is shared, the object cache 114 is not flushed at the end of a client transaction. Thus, cached objects encountered by a client transaction, e.g., during query processing, must be refreshed by values obtained through a tier 3 106 retrieval if a cached object copy is older than the start of the client transaction.

The query service 112 is briefly described here, and it will be described in greater detail in the Section 2.2. The query service 112 accepts queries over collections of objects. These collections can be of view types, derived from tables contained in databases managed at tier 3 106. Queries that return handles on objects or invoke methods on objects require processing called "object building" during query evaluation. That is, the query evaluator calls caching functions with the necessary data to activate or create (i.e., "build") cached copies of objects in the memory. Once found or created, the object is returned to the query evaluator for further processing. If the object is part of the query's result, the object is also returned to the client application 108 on tier 1 102. If the object cache 114 contains deferred updates, query evaluation must also take these updates into consideration in computing the query's result.

In the exemplary three tier environment, each tier may comprise, inter alia, one or more processors connected to one or more data storage devices, such as a fixed or hard disk drive, a floppy disk drive, a CDROM drive, a tape drive, or other device.

Operators of the three tier environment 100 may use a standard operator interface, such as IMS/DB/DC®, CICS®, TSO®, OS/390®, ODBC® or other similar interface, to transmit electrical signals to and from the client application 108 that represent commands for performing various search and retrieval functions, termed queries, against the databases 116. In the present invention, these queries conform to the Structured Query Language (SQL) standard, and invoke functions performed by Relational DataBase Management System (RDBMS) software 116.

SQL has evolved into a standard language for RDBMS software and has been adopted as such by both the American National Standards Institute (ANSI) and the International Standards Organization (ISO). SQL allows users to formulate relational operations on the tables either interactively, in batch files, or embedded in host languages, such as C and COBOL. SQL allows the user to manipulate the data. Those skilled in the art will recognize, however, that the present invention is applicable to any database software, whether or not the database software uses SQL.

Generally, the client application, business object server, RDBMS software, and the instructions derived therefrom, are all tangibly embodied in a computer-readable medium, e.g. one or more of the data storage devices. Moreover, the client application, business object server, RDBMS software, and the instructions derived therefrom, are all comprised of instructions which, when read and executed by the three tier environment 100 causes the three tier environment to perform the steps necessary to implement and/or use the present invention. Under control of one or more operating systems, the client application, business object server, RDBMS software, and the instructions derived therefrom, may be loaded from the data storage devices into a memory of the computer system for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

2.2 Object Query Service

Figure 2:
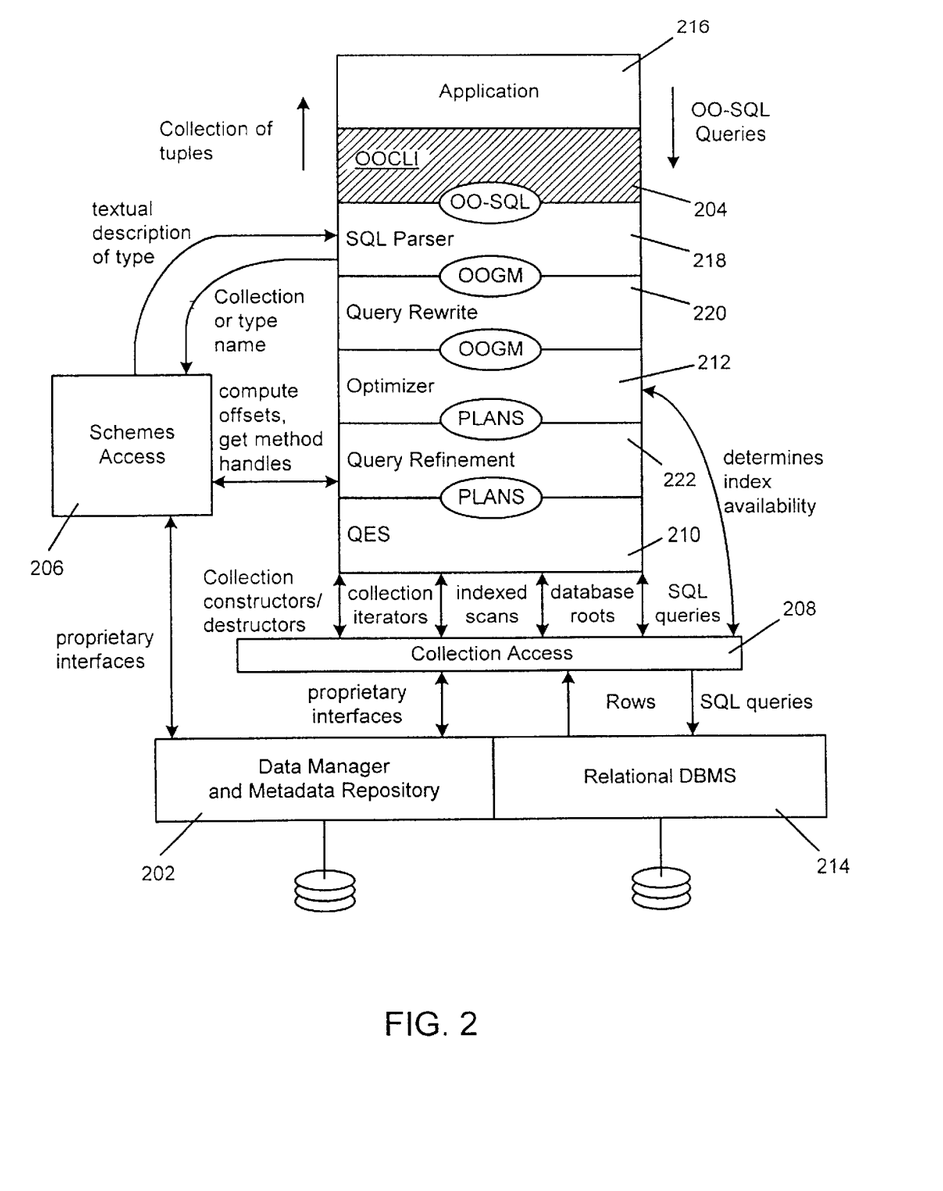
FIG. 2 illustrates an object oriented-SQL ("OO-SQL") query engine 200 that may be used in accordance with a preferred embodiment of the present invention.

FIG. 2 illustrates an object oriented-SQL ("OO-SQL") query engine 200 that may be used in accordance with a preferred embodiment of the present invention. The OO-SQL query engine is based upon the design of the Starburst relational DBMS, which is described in L. M. Haas, W. Chang, G. M. Lohman, J. McPherson, P. F. Wilms, G. Lapis, B. Lindsay, H. Pirahesh, M. Carey, and E. Shekita, *Starburst Mid-Flight: As the Dust Clears*, IEEE Transactions on Knowledge and Data Engineering, pages 143–160, March 1990, which is incorporated by reference herein. The object oriented DBMSs or object oriented systems over which the query engine runs act as the data manager 202.

The components that are involved with portability are: the Object-Oriented Call Level Interface (OOCLI) 204, the Schema Access component 206, and the Collection Access component 208. The OOCLI 204 is an application programmer interface (API) that accepts queries and returns results in the form of collections of tuples or objects.

The Schema Access component 206 is called during query compilation to describe the schemas of objects contained in the collections that are referenced in queries. The schemas of types of intermediate nodes referenced in path expressions are also obtained through this interface. Collections that are views are interrogated during query compilation to extract the view definitions that implement them. These definitions are parsed and included in the query graph (internal representation) of the query. The textual representation of schemata simplifies the management of schema information for views. During query refinement, path expressions are traversed to establish the data access methods used to retrieve the data. If, for example, offsets are used, then path expression nodes are assigned the necessary offsets to retrieve the data members that they represent. If methods are used, then method handles are obtained for each method node in the path expression. The meta data interfaces describe local and inherited members (i.e., the schema information retrieved for a given type contains both local and inherited members).

The Collection Access component's 208 role during query optimization is to document the availability of indexes. Its major tasks are performed later, during query execution, under the control of the Query Evaluation Subsystem (QES) 210. Collections that store temporary or intermediate results are created and dropped during query evaluation. Sequential scans are performed by creating and opening iterators (or cursors) that scan through a collection of objects. Indexed scans, if available, are executed by setting lower and upper bounds.

Collections of row types can be formed from relational tables. These collections and types can participate in the definition of views and view types thereby creating object views of relational database tables. The Schema Access Component 206 indicates the type of backing store for each collection. This information is used by the Optimizer 212 during query optimization for query plan generation. If tables participate in a query, the Optimizer 212 decides whether a query can be resolved by one or more relational queries. If a query can be resolved by one or more relational queries, the Optimizer 212 generates these relational queries as part of the object query plan. Such queries are then submitted the Relational DBMS 214 during query evaluation.

Typically, an Application 216 submits an object-oriented SQL query to retrieve data from the Relational DBMS 214. The OOCLI 204 accepts the query. The SQL Parser 218 parses the query. During parsing, the SQL Parser 218 provides collection or type name information to the Schema Access Component 206 and obtains a textual description of a type from the Schema Access Component 206. The SQL Parser 218 generates and forwards an object query graph model ("OQGM"), which is a structure that represents a parsed query. The Query Rewrite Component 220 receives and modifies the OQGM, and forwards the modified OQGM to the Optimizer 212. The Optimizer 212 optimizes the query and generates a plan. The Optimizer 212 works with the Collection Access Component 208 to determine index availability when generating the plan. The Optimizer 212 forwards the plan to the Query Refinement Component 222. The Query Refinement Component 222 works with the Schemas Access Component 206 to compute offsets and get method handles for methods used to refine the plan. Then, the Query Refinement Component 222 refines the plan and forwards the plan to the QES 210. The QES 210 performs processing, including transmitting the SQL query to the Collection Access Component 208, which retrieves data from the Relational DBMS 214. The retrieved data is then returned to the Application 216, in the form of, for example, a collection of tuples.

The DECAF optimization may reside in one or more components of the object oriented-SQL ("OO-SQL") query engine 200. In a preferred embodiment, for example, the DECAF optimization may reside as part of the Optimizer 212 and as part of the Query Rewrite Component 220.

Kiernan et al. provides a detailed description of all the query processing components of the system.

2.3 Overview of Object Views

This section briefly introduces row types, object view types, and object views.

2.3.1 Relational Row Types

In the DECAF optimization, one objective is to provide object views of heterogeneous data, including relational tables. In order to achieve this, there is a need to distinguish between types and collections of element types. If tables are to be used as parameters to OODB view types, each table's elements must have an associated type similar to other collections in the system. Examples of such row types for relational tables follow.

```
row type db2depttable (dno integer,
                       dname varchar,
                       dfloor integer,
                       budget integer
                       primary key (dno))
row type db2emptable (eno integer,
                      ename varchar,
                      esal double precision,
                      eage integer,
                      edid integer not null,
                      gender varchar,
                      address varchar,
                      primary key (eno),
                      foreign key (edid) references db2depttable (dno))
```

In the first example above, a row type named "db2depttable" is defined as having four columns and a primary key. The four columns are "dno", which is an integer representing a department number, "dname", which is a variable length character string representing a department name, "dfloor", which is an integer representing a department floor, and "budget", which is an integer representing a department budget. The primary key is "dno".

In the second example above, a row type named "db2emptable" is defined as having seven columns, a primary key, and a foreign key. The seven columns are "eno", which is an integer representing an employee number, "ename", which is a variable length character string representing an employee name, "esal", which is a double precision number representing an employee's salary, "eage", which is an integer representing an employee's age, "edid", which is an integer representing an employee's department identifier, "gender", which is a variable length character string representing an employee's gender, and "address", which is a variable length character string representing an employee's residential address. Additionally, the primary key is "eno", and the foreign key "edid" corresponds to the "eno" column of a row type "db2depttable".

Once a row type has been defined, the row type can be referenced in an alias definition. The alias definition associates a collection name and an underlying element type (row type) with a named relational table. Thus, aliases define a set of relational tables, and the alias names can then appear in OO-SQL queries or definitions of view types. The following are examples of aliases for relational tables:

alias db2dept for db2depttable (db1.kiernan.dept)
    alias db2emp for db2emptable (db1.kiernan.emp)

The alias "db2dept" is an alternative name for a table "db1.kieman.dept", which is of row type "db2depttable". The alias "db2emp" is an alternative name for a table "db1.kiernan.emp", which is of row type "db2empttable".

2.3.2 View Types

For illustration, view types are defined below that have an identical schema to the row types presented above. In real applications, these views would define attributes that are references, nested sets (which are described in Kiernan et al.), and expressions (e.g., salary * 1.1). However, these features are not necessary to demonstrate the DECAF optimization, and so they do not appear in the examples.

The OO-SQL view types represent object types with attributes, and possibly methods, in contrast to tabular rows with columns. View types accept parameters that identify the types of source collections from which view types are derived. Aside from being parameterized, the view types are similar to views found in commercial relational systems. In the DECAF optimization, these types also correspond to application language types defined in a programming language, for example, C++, which is described in Bjaime Stroustrup, *The C++ Programming Language*, Addison-Wesley Publishing Co., 1987, which is incorporated by reference herein. The following are examples of view types over row types:

```
type VTEmp  (this db2emptable):
            (no integer,
             name character,
             salary integer,
             age integer,
             did integer,
             primary key (no)) as
(
select  e.eno,
        e.ename,
        e.esal,
        e.eage,
        e.edid
from this e
)
type VTDept (this db2depttable):
            (no integer,
             name character,
             floor integer,
             primary key (no)) as
(
select  d.dno,
        d.dname,
        d.dfloor
from this d
)
```

View type "VTemp" is based on a row type of "db2emptable", which was defined above. The view type "VTemp" accepts row type "db2emptable" as a parameter. Additionally, the view type "VTemp" has five attributes and a primary key. The five attributes are "no", "name", "salary", "age", and "did", which correspond to the columns in row type "db2emptable". The primary key is "no". The "select" statement selects columns from a collection of type "db2emptable".

View type "VTDept" is based on a row type of "db2depttable", which was defined above. The view type "VTDept" accepts row type "db2depttable" as a parameter. View type "VTDept" has three attributes and a primary key. The three attributes, "no", "name", and "floor", and the primary key "no", correspond to the columns and primary key, respectively, of the row type "db2depttable". The "select" statement selects columns from a collection of type "db2depttable".

Collections can be defined that are based on a view type. The following examples are view collections (i.e., object representations of tables) over relational tables.

collection VEmp on VTEmp (db2emp)

collection VDept on VTDept (db2dept)

For example, collection "VEmp", is of view type "VTEmp", which is derived from a collection based on row type db2emptable. Collection "VEmp" uses an alias "db2emp", which is a relational table. Similarly, collection "VDept", is of view type "VTDept", is derived from a collection based on row type db2depttable. Collection "VDept" uses an alias "db2dept", which is a relational table. The collections present an object-oriented view of relational tables.

Application types (e.g., classes in C++) can be generated that correspond to the view types described above. Application types, along with their implementation, can be automatically generated by a tool which guarantees their correspondence with their OO-SQL view type counterparts. The following example is of a C++ rendering of employee department data objects:

```
class VTEmp {
    private:
        db2emptable *e;
    public:
        VTEmp (db2emptable *eparm) {e = eparm;}
        int get_no () {return (e->atts [0]);}
        char *get_name () {return (e->atts [1]);}
        int get_sal () {return (e->atts [2]);}
        int get_age () {return (e->atts [3]);}
        int get_did () {return (e->atts [4]);}
}
class VTDept {
    private:
        db2depttable *d;
    public:
        VTDept (db2depttable *dparm) {d = dparm;}
        int get_no () {return (d->atts [0]);}
        char *get_name () {return (d->atts [1]);}
        int get_floor 0 {return (d->atts [2]);}
```

Class "VTEmp" contains C++ methods to operate on data in table "e". The C++ methods defined are get_no ( ), get_name ( ), get_sal ( ), get_age ( ), and get_did ( ).

Class "VTDept" contains C++ methods to operate on data in table "d". The C++ methods defined are get_no ( ), get_name ( ), and get_floor ( ).

Objects of view types can be retrieved as instances of application objects (e.g., an object can be instantiated based on a class defined in C++). For example, the following query returns instances of view type "VTEmp" contained in the view collection "VEmp" with salaries greater than 10:

select e from VEmp e where e.sal>10

An application type defined in, for example, C++ corresponds to view type "VTEmp". In evaluating the above query, which requires object building, the type constructor for "VTEmp" will be called with a handle on a row of a table identified by the correlation variable "e". The schema of the underlying row object is given by the alias. In the above example, a row object for "e" has columns "no", "name", "salary", "age", and "did".

3. Query Optimization with Deferred Updates and Autonomous Sources

The DECAF optimization is a query optimization technique for an object query system with an object cache supporting deferred updates to underlying databases. The DECAF optimization allows updates to the databases while data in the object cache is being modified (i.e., updates performed by transactions other than the transaction using the object cache at a given time). For data integrity, query results that are returned to a client application must include committed updates made by other transactions. Query results must also be consistent with any deferred updates that exist only in the object cache.

The DECAF optimization is organized into three steps. In the first step, the DECAF optimization rewrites queries so that in-cache deferred updates are taken into consideration in determining a query's result. In the second step, the DECAF optimization detects objects that have been deleted in the database or no longer qualify for a query's result due to a database update, but were preserved in the cache beyond some transaction boundary. The second step is only used in environments in which the object cache is maintained past transaction boundaries (i.e., where the contents of the object cache are preserved after the application using the object cache commits). Additionally, in the second step, the DECAF optimization transforms the query having an object view into a query that the RDBMS will understand. In the third step, the DECAF optimization translates the pushdown queries into SQL against the underlying tables and rewrites groups of two or more SQL queries destined for the same source table into a single query.

The DECAF optimization uses query pushdown to exploit the query processing capabilities of underlying systems and to reduce data transfer. First, a set of illustrative examples are presented to highlight the behavior of the DECAF optimization. Then, the general technique of the DECAF optimization is presented.

3.1 Queries with Simple Predicates

OO-SQL queries, which are described in Kiernan et al., that involve at most a single table are referred to as queries with simple predicates. These include queries with scalar comparisons, range testing, null testing, and like testing. For example, the following simple query retrieves employee numbers for employees having a salary greater than 50,000.

select e.no from VEmp e where e.salary>50000

Since the object cache can contain employees belonging to the VEmp collection with updated salaries, the query cannot be resolved by simply querying the underlying database alone. The DECAF optimization will process this query as shown below:

1. The DECAF optimization rewrites the query as follows:

cache VEmp as select e from VEmp e where e.salary>50000 select e'.no from cache (VEmp) e' where e'.salary>50000

The DECAF optimization thus transforms the query into two subqueries. The first subquery references the database content of the VEmp collection. The first subquery retrieves data (i.e., a result) into the object cache as indicated by the "cache VEmp as" clause. The "select e from Vemp e" statement identifies the data to be retrieved into the object cache from the RDBMS. The result will be added to the object cache content of collection VEmp. The DECAF optimization uses a "select e" statement because objects of type VTEmp, which are referenced by the correlation "e", are retrieved into the object cache.

The second subquery refers to the resulting object cache content of collection VEmp. The DECAF optimization uses the cache function in the "from cache" clause of the second subquery to indicate the object cache content of a collection.

The first subquery is run against the database, while the second subquery is run against the object cache, as will be discussed in steps 2 and 3 below.

2. The DECAF optimization modifies the query having an object view into a query that the RDBMS will understand. The DECAF optimization submits the following SQL query to the underlying database, filtering the results to include those employees in the database who have a salary greater than 50,000. This query results from query rewrite transformations being applied to the first subquery in step 1 above.

select e.no, e.name, e.esal, e.eage, e.edid from db2emp e where e.esal>50000

There could exist an updated employee $u_1$ whose salary was previously 60,000 but reduced to 40,000 by an update not yet propagated to the database. Conversely, there might exist another updated employee $u_2$ whose salary was previously 40,000 but augmented to 60,000 by another update not yet propagated to the database. Employee $u_1$ is selected by the query over the database, and employee $u_2$ isn't. By itself, this query thus presents an incorrect interpretation of the user's query with respect to the unpropagated updates on employees $u_1$ and $u_2$. Although not selected by the query to the database, employee $u_2$ is present in the object cache, and the object representing $u_2$ has the updated salary value. Employee $u_1$ is selected by the query in step 2, but since $u_1$ is also in the object cache at the time of the query, the object cache copy will be preserved, overriding the database value and, thereby, also preserving the cached updated salary value.

3. The DECAF optimization runs the second subquery from step 1 above, "select e'.no from cache VEmp e' where e'.salary>50000", against the cache content of the VEmp collection (i.e., which is a collection of objects in the object cache). At this time, the object cache contains a superset of the desired result set. The second subquery filters out $u_1$ (as well as other non-qualifying cached employees) and includes $u_2$ in the result, and is consistent with the database and with application updates at the time the query is issued. Inserted and deleted employees are handled similarly.

3.2 Join Queries

OO-SQL queries, which are described in Kiernan et al., that have simple predicates and involve one or more tables, are referred to as queries with join predicates. The relationships among tables are established with predicates that are join expressions. These include queries with scalar comparisons, range testing, null testing, and like testing. For example, the following join query selects employees over 40 who work in departments that are on the fourth floor.

select e.no from VEmp e, VDept d where e.age>40 and e.did=d.no and d.floor=4

The above query is actually a semi-join because no element of "d" appears in the projection list. Aside from insertions and deletions, three types of deferred updates can affect this query's result: an employee's age may have been updated, an employee may have changed departments, and a department may have moved from one floor to another.

The DECAF optimization transforms and correctly resolves the query as follows:

1. The DECAF optimization rewrites the query as follows:

cache VEmp as select e from VEmp e where e.age>40 cache VDept as select d from VDept d where d.floor=4 and d.no in (select e'.did from cache (VEmp) e')

select e'.no from cache (VEmp) e', cache (VDept) d' where e'.age>40 and e'.did=d'.no and d'.floor=4

The DECAF optimization transforms the query into three subqueries. The first subquery is used to retrieve employee data from the database into the object cache. The second subquery is used to retrieved department data from the database into the object cache. The third subquery is run against the object cache to obtain the response to the original query.

2. The DECAF optimization submits the following two separate SQL queries to the RDBMS, where the two SQL queries below correspond to the first and second subqueries from step 1:

select e.* from db2emp e where e.age>40 select d.* from db2dept d where d.dfloor=4 and d.no in (V1, V2, . . . , Vn)

The (V1, V2, . . . , Vn) clause corresponds to the resulting cache occurrences of e'.did. The "select e'.did from cache (VEmp) e'" clause in the second subquery of step 1 is an optimization which corresponds to introducing the predicate d.no in (V1, V2, . . . , Vn) and which is applied to restrict the result of the second query to include only those departments on the fourth floor that will actually join with employees in the cache. In general, this optimization is only performed by the DECAF optimization if there exists another simple predicate on the joining quantifier, and, in this example, e.age>40 is such a predicate.

The DECAF optimization takes advantage of predicates that involve a single quantifier to restrict the number of results extracted from the relational database.

3. The DECAF optimization then evaluates the third subquery from step 1 above against the object cache:

select e'.no from cache (VEmp) e', cache (VDept) d' where e'.age>40 and e'.did=d'.no and d'.floor=4

Deferred updates that reflect employees changing departments are taken into consideration by the final in-cache join, as employees having new "age" values are present in the cache. The in-cache evaluation of the query takes these new values into consideration. Deferred updates to department floors are present in the cache and are handled similarly. Insertions and deletions are also handled similarly.

3.3 Queries with Subqueries

Ignoring grouping and aggregation, subqueries can appear in OO-SQL queries as projections elements, subqueries that are basic predicates (i.e., the subquery returns a single value instead of a set of values), exists subqueries, and IN, ANY, and ALL subqueries. For example, the following query retrieves employee numbers for employees over 40 whose department has no employees under 30 with the same name.

```
select e1.no from VEmp e1
where e1.age>40 and
    not exists (select e2.no from VEmp e2
        where e1.did = e2.did and
            e1.name = e2.name and
            e2.age<30)
```

1. The DECAF optimization rewrites the query into the following series of queries:

```
cache VEmp as
select e1 from VEmp e1
where e1.age>40
cache VEmp as
select e2 from VEmp e2
where e2.did in (select e1'.did from cache (VEmp) e1') and
    e2.name in (select e1'.name from cache (VEmp) e1') and
    e2.age <30
select e1'.no from cache (VEmp) e1'
where e1'.age>40 and
not exists (select e2'.no from cache (VEmp) e2'
    where e1'.did = e2'.did and
        e1'.name = e2'.name and
        e2'.age<30)
```

The DECAF optimization transforms the original query into three subqueries. The first subquery is used to retrieve employee data from table "e1" in the database into the object cache. The second subquery is used to retrieve additional employee data from table "e2" in the database into the object cache.

The second subquery has two subqueries: the first "e2.did in" subquery selects employees who work in the same departments as employees in the object cache, and the second "e2.name in" subquery selects employees having the same name as employees in the object cache. However, the predicate in the original query says that employees must work in the same department and have the same name. The two "in" subqueries thus retrieve more results than necessary into the object cache. This, in fact, is due to a limitation of SQL that doesn't allow, in its current form, tuple expressions to be used in "in" subqueries. In some systems, a single subquery of the form (e.g., tuple (e2did, e2.name) in (select tuple (el '.did, e1 '.name) from cache (VEmp) e1')) could be used.

2. The two following translated SQL queries are then run to extract the set of employees that might satisfy the predicate when the query is run against the object cache:

Query 1:
    select e.* from db2emp e where e.eage>40
Query 2:
    select e.* from db2emp e
    where e.eage<30
    and e.did in (V1, V2, . . . , Vn)
    and e.name in (W1, W2, . . . , Wn)

Since Query 2 has dependencies upon Query 1 (i.e., the results of V1, V2, . . . , Vn and W1, W2, . . . , Wn are computed from Query 1), the two queries cannot be combined.

3. Having extracted the previous results from the database into the object cache and retrieved the corresponding employees in the object cache, the following query is then run against the object cache alone:

```
select e1'.no from cache (VEmp) e1'
where e1'.age>40
    not exists (select e2'.no from cache (VEmp) e2'
        where e1'.did = e2'.did and
            e1'.name = e2'.name and
            e2'.age<30)
```

In many respects, queries with subqueries are handled similarly to queries with joins, which were discussed above.

3.4 Queries with Grouping and Aggregation

Queries with grouping and aggregation can also have predicates specified in a "where" clause with semantics similar to queries with simple predicates and join queries. Therefore, the optimizations described in those sections are also applicable here. For example, the following query selects the average age of employees over 40 working in departments on the fourth floor, and only departments having more than 10 employees are selected:

select d.no, avg (e.age)
from VEmp e, VDept d
where e.age>40 and d.floor=4 and e.did=d.no
group by d.no
having count (*)>10

The conjuncts "e.age>40", "d.floor=4", and "e.did=d.no" are handled similarly to the queries presented in Sections 3.1 and 3.2. First, the query processor of the DECAF optimization handles the "from" and "where" clauses of the query, creating a result that is the subset of the cross product of "VEmp" and "VDept" and that satisfies the predicate in the "where" clause. Grouping is applied to this result, and the predicate in the "having" clause determines which groups participate in the result. The average age is computed for these result groups and presented as the query's result.

The query specified department number "no" as the grouping attribute (i.e., results are grouped according to equal values of d.no). Any updates to the "no" attribute can, therefore, alter the contents of one or more groups. However, since the "no" attribute is a key, it might be assumed that the "no" attribute would not be updated. Nevertheless, departments can be inserted and deleted, and employees can migrate from one department to the next and can be hired or leave the company. Any such deferred updates can alter the formation of groups, and can therefore change the query's result. If grouping and aggregation are present in the query, the query is transformed such that grouping and aggregation are performed in the object cache.

If a group by clause is not given, the result of the "from" and "where" clauses form a single group against which the aggregate computations are applied. In some simple cases, it might be possible to optimize such queries by adjusting the result of a query against the source database to reflect in-cache updates. For example, the query "select agg (ai) from col" (where agg is an aggregate operation, such as sum, min, max, count, or avg, "ai" is a column (or member) and "col" is a collection) has no predicates and returns a single result equal to the aggregate computation applied to all elements of a collection. For such queries, operations for the aggregate, such as sum, can be adjusted for each updated object in the collection "col" in the object cache by subtracting the initial value of the column "ai" and adding the updated value of column "ai" to the result. Similar schemes can be derived for other aggregate computations. However, this type of optimization is limited to simple aggregate queries.

3.5 Union Queries

Union queries are composed of N select statements plus N−1 union clauses. Each union clause appears between two "select" statements. The union clause can specify the "all" option to specify whether or not duplicate elimination is to take place between two results participating in the query. Given a union query of the form $s_1 u_1 s_2 u_2 s_3, \ldots, u_{n-1} s_n$ where $s_i$ is a select statement, and $u_i$ is a union clause, the query is interpreted as $(((s_1 u_1 s_2) u_2 s_3), \ldots, u_{n-1} s_n)$. The parentheses show that the result $r_1$ of $s_1 u_1 s_2$ is computed first, the result $r_2$ of $r_1 u_2 s_3$ is computed next, and so on. Note that if the last union $u_{n-1}$ is a "union" (not a "union all"), then the result contains only distinct rows, regardless of whether "all" is specified in the previous $u_1$. Suppose, for example, that there are two collections "VEmp1" and "VEmp2" instead of a single collection "VEmp". The following query selects employees in "VEmp1" that are over 40 and employees in "VEmp2" that are under 30.

select e1.no from VEmp1 e1 where e1.age>40
    union
    select e2.no from VEmp2 e2 where e2.age<30

For this example, assume that only "VEmp1" currently has deferred updates associated with it. The query is then rewritten and resolved as follows.

cache VEmp1 as
    select e1 from VEmp1 e1
    where e1.age>40
    select e1'.no from cache (VEmp1) e1' where e1'.age>40
    union
    select e2.no from VEmp2 e2 where e2.age>30

In the above query, the "select" statement $s_2$ is pushed down to the RDBMS. The "select" statement $s_1$ is handled similarly to queries with simple predicates described above. The resulting union is performed in the object cache. Union operations $u_1, \ldots, u_{i-1}$ can be pushed down to the RDBMS if all "select" statements $s_1, \ldots, s_i$ reference collections that the RDBMS stores having no deferred updates. If $s_j$ references a collection having deferred updates, then union operations $u_{j-1}, \ldots, u_{n-1}$ are performed in-memory using the object cache.

This general strategy can be applied in all cases (i.e., cases in which union $u_i$ is either a union with or without (union all) duplicate elimination). If, for example, a query's result is duplicate free (i.e., union $u_{n-1}$ is a duplicate eliminating union), then the union of all $s_i$ referencing collections that don't contain deferred updates can be pushed down as a whole.

3.6 The DECAF System

The DECAF optimization is organized into three steps. In the first step, the DECAF optimization rewrites queries so that in-cache deferred updates are taken into consideration in determining a query's result. In the second step, the DECAF optimization detects objects that have been deleted in the database or no longer qualify for a query's result due to a database update, but were preserved in the cache beyond some transaction boundary. The second step is only used in environments in which the object cache is maintained past transaction boundaries (i.e., where the contents of the object cache are preserved after the application using the object cache commits). Additionally, in the second step, the DECAF optimization transforms the query having an object view into a query that the RDBMS will understand. In the third step, the DECAF optimization translates the pushdown queries into SQL against the underlying tables and rewrites groups of two or more SQL queries destined for the same source table into a single query.

The DECAF optimization applies the first step during query rewrite. If the transaction environment is based upon Optimistic Locking with Read-Committed, given a query Q, the DECAF optimization always applies the rewrite below. If, however, the transaction environment is based upon Serializable Repeatable Read, then given a query Q, if any quantifier $q_i$ is bound to view collection $C_i$ that contains deferred updates, the DECAF optimization applies the rewrite below. That is, in the latter case, in the absence of deferred updates, the object cache contents can be ignored in the optimization of a query since they are consistent with the state of the source database.

(a) Create an initially empty subquery $Q_C$, where $Q_C$ denotes a query that will be run against the cache. For each $q_i \epsilon Q$, generate a quantifier $q_i'$ which is bound to the cache content of collection $C_i$ and add $q_i'$ to $Q_C$.

(b) For each quantifier $q_i \epsilon Q$, also generate an initially empty subquery $Q_{Pi}$ and move $q_i$ to $Q_{Pi}$, where the $Q_P$'s denote pushdown queries that will be run against an underlying database. Quantifier $q_i$ is thus set to range over the database copy of the collection $C_i$.

(c) Replicate all simple conjuncts $A_i \epsilon Q$ (i.e., predicates that only involve $q_i \epsilon Q$) and modify the replicas to reference $q_i'$ instead of $q_i$. Add the replicas to Qc.

(d) For each simple conjunct $A_i \epsilon Q$ (i.e., predicates that only involve $q_i \epsilon Q$), move $A_i$ to $Q_{Pi}$.

(e) If $A_r \epsilon Q$ is an equi-join predicate of the form $q_j \cdot c_k = q_i \cdot c_1$, where $c_k$ is the joining column of $q_j$ and $c_1$ is the joining column of $q_i$, add a predicate to $Q_{Pi}$ of the form $q_i \cdot c_1 \epsilon \{V_1, \ldots, V_n\}$, where $V_1, \ldots, V_n$ is a list of values for $q_j' \cdot c_k$ obtained from the object cache after having retrieved objects corresponding to $q_j$ from the database. This equi-join rewrite is only used if there exists a simple predicate on $q_j$ in addition to the equi-join predicate involving $q_j$, because the purpose of the equi-join rewrite is to restrict the number of results returned from a query to the database by selecting only those elements that actually match the object cache contents following the retrieval of results from an initial query to the database.

(f) For all remaining conjuncts $A_r \epsilon Q$, rewrite each $A_r$ to reference $q_i' \epsilon Q_C$ instead of $q_i \epsilon Q$, and move $A_r$ to $Q_C$ The Step 1 rewrites are illustrated using the following query fragment.

Before rewrite:
    select e.name, d.name from VEmp e, VDept d
    where e.did=d.no and e.age>40 and d.floor=4
After rewrite:
Query $Q_{P1}$:
    cache VEmp as
    select e from VEmp e
    where e,age>40
Query $Q_{P2}$:
    cache VDept as
    select d from VDept d
    where d.floor=4
      and d.no in (select e'. did from cache (VEmp) e')
Query $Q_C$:
    select e'.name, d'.name from cache (VEmp) e', cache (VDept) d'
    where e'.did=d'.no and e'.age>40 and d'.floor=4

In the example, "VEmp" and "VDept" are view collections (i.e., object representations of tables "Emp" and "Dept"). The object cache denotation causes "e'" to iterate over the elements of collection "VEmp" that are in the object cache. The quantifier "d'" is handled similarly. The conjunct "d.no in select e'.did from cache VEmp e'" corresponds to the equi-join transformation used to restrict results retrieved for "VDept d". The subquery will be replaced by a list of values producing d.no in (V1, V2, ... ,$V_n$), which correspond to object cache occurrences of "e'.did" after the objects corresponding to "e" are retrieved from the database.

The DECAF optimization applies the second step to detect objects that are deleted or updated in the source database, but that are still present in the object cache. This problem is introduced because the object cache can be preserved beyond transaction boundaries. The second step is omitted if the object cache is purged at transaction boundaries.

For each quantifier $q_i' \epsilon Q_C$ described in (a) of Step 1 above, add a conjunct to $Q_C$ of the form TS ($q_i'$)>TS($T_j$), where TS is a function that returns a timestamp that the object cache associates with an object. TS($q_i'$) returns the timestamp at which the object referenced by $q_i'$ was last refreshed in the object cache (i.e., read from the source database), and TS($T_j$) returns the start timestamp of the current transaction $T_j$. This predicate eliminates any result from the in-cache collection that satisfies the query predicate, but which hasn't been refreshed by the query. These results correspond to objects in the object cache that either no longer exist in the database or no longer qualify for a query's result (i.e., due to an update to the source database that didn't go through the object cache). Once detected, deleted objects are purged from the object cache. Note that the timestamps associated with any objects in the object cache with deferred updates will be based on their time of update; updated objects are therefore not eliminated from query results. This rewrite is demonstrated using the example given in Step 1.

Before rewrite:

select e'.name, d'.name from cache (VEmp) e', cache (VDept) d' where e'.did=d'.no and e'.age>40 and d'.floor=4

After rewrite:

select e'.name, d'.name from cache (VEmp) e', cache (VDept) d' where e'.did=d'.no and e'.age>40 and d'.floor=4
and TS (e')>TS (Tj) and TS (d')>TS (Tj)

The conjuncts TS (e')>TS (Tj) and TS (d')>TS (Tj) ensure that the timestamps corresponding to objects referenced by "e'" and "d'" are later than the timestamp associated with the current transaction Tj. For example, TS (e')>TS (Tj) checks whether the timestamp of an object in the object cache "e'" is greater than the timestamp of the transaction. If the timestamp of the cached object is greater than the timestamp of the transaction, then the cached object was updated or refreshed after the transaction started. If the timestamp of the cached object is less than the timestamp of the transaction, then the cached object was not updated or refreshed after the transaction started.

The DECAF optimization applies the third step to optimize retrieval of data from databases. For each relational table $R_j \epsilon Q_{Pi}$, generate SQL push-down queries as follows:

(a) If there is a single quantifier q ranging over "$R_j$", generate a SQL query for $R_j$ applying the conjuncts involving "q". For example, the following query fragment applies a predicate involving table db2emp.

. . . from db2emp q where q.age>40

(b) If there are multiple quantifiers $q_1 \epsilon Q_1, q_2 \epsilon Q_2, \ldots, q_n \epsilon Q_n$ all ranging over $R_j$, generate a disjunctive SQL query for $R_j$ with the following predicates. For each quantifier C, create a disjunct containing all the predicates involving "$q_i$".

The final SQL query that is generated only contains a single quantifier for "$R_j$". For example, the following query fragments demonstrate this transformation.

. . . from db2emp q1 where q1.eage>40

. . . from db2emp q2 where q2.esal<50000.

is transformed into the SQL query:

. . . from db2emp q where q.eage>40 or q.esal<50000 . . .

This transformation ensures that employees satisfying both predicates are present in the object cache when the query is evaluated against the object cache. Since join predicates are evaluated in the object cache (i.e., they are not pushed down), such combinations of predicates are likely to occur. This transformation results in replacing multiple SQL queries with a single SQL query to be pushed down to the source database.

Figure 3:
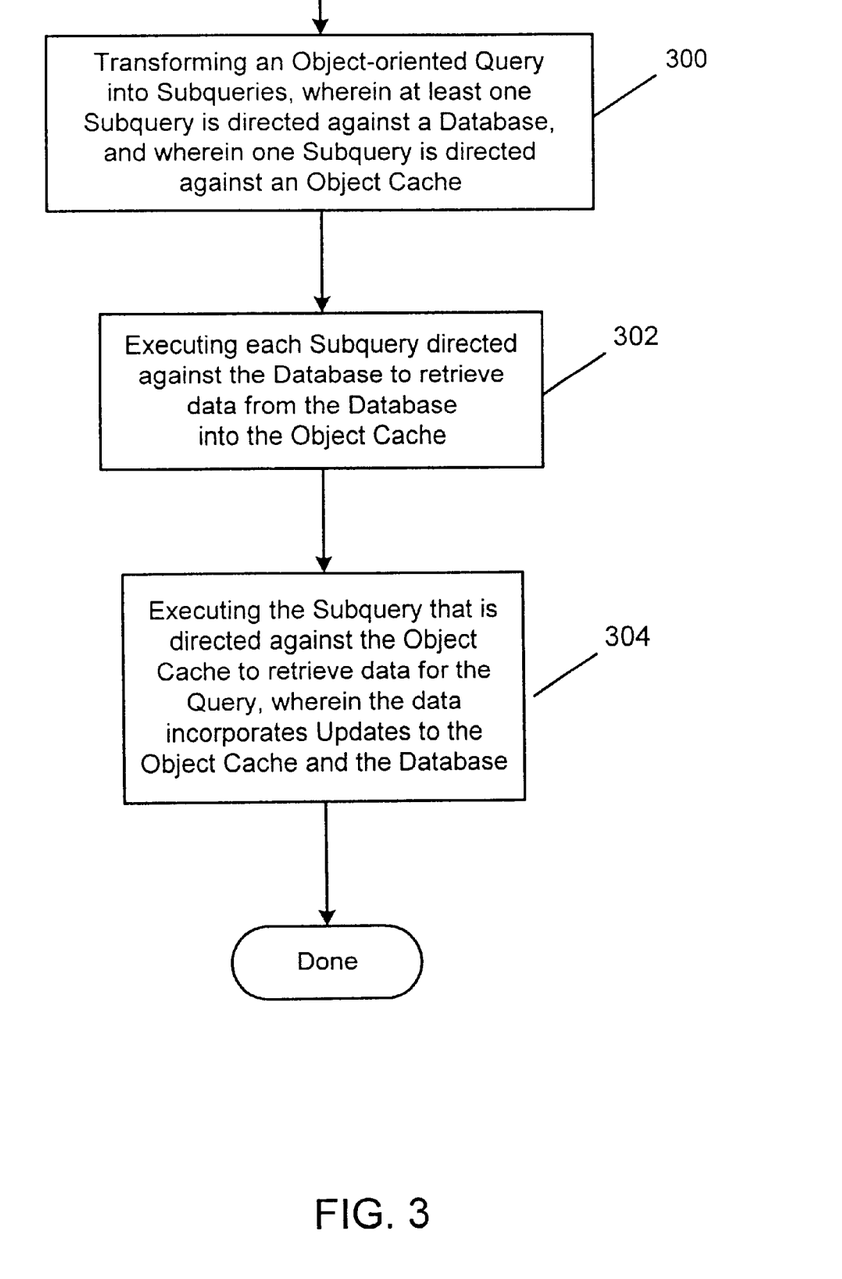
FIG. 3 is a flow diagram illustrating the basic steps performed by the DECAF optimization.

FIG. 3 is a flow diagram illustrating the basic steps performed by the DECAF optimization. In Block 300, the DECAF optimization transforms an object-oriented query into subqueries. At least one subquery is directed against a database, and one subquery is directed against an object cache. In Block 302, the DECAF optimization executes each subquery directed against the database to retrieve data from the database into the object cache. In Block 304, the DECAF optimization executes the subquery that is directed against the object cache to retrieve data for the query. The data that is retrieved incorporates updates to the object cache and the database.

B. Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. While the DECAF optimization has been presented in terms of view definition language, the invention presented in this disclosure is applicable to similar views over any data model that supports a cache with similar deferred updates.

In summary, the present invention discloses a method, apparatus, and article of manufacture for a computer-implemented DECAF optimization. The invention presented in this disclosure performs query optimization for object queries using an object cache with deferred cache updates and autonomous sources (i.e., independently updatable).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing an object-oriented query to retrieve data from a database stored on a data storage device connected to a computer, the method comprising the steps of:

transforming the object-oriented query into subqueries, wherein at least one subquery is directed against a database, and wherein one subquery is directed against an object cache;

executing each subquery that is directed against a database to retrieve data from the database into the object cache; and executing the subquery that is directed against the object cache to retrieve data for the query, wherein the data incorporates updates to the object cache and updates to the database.

2. The method of claim 1, wherein the object-oriented query is executed in an optimistic locking with read committed environment.

3. The method of claim 1, wherein the object-oriented query is executed in a serializable repeatable read environment.

4. The method of claim 1, wherein data in the object cache is updated, further comprising the step of deferring transmission of the updated data to the database.

5. The method of claim 1, further comprising the step of updating the database while the object cache is being modified.

6. The method of claim 1, wherein the subquery that is directed against a database is an object-oriented subquery, further comprising the step of transforming the object-oriented subquery to a database subquery.

7. The method of claim 1, further comprising the step of detecting objects that have been deleted in the database, but that remain in the object cache.

8. The method of claim 1, wherein the database is shared.

9. The method of claim 1, wherein the object cache is shared.

10. The method of claim 1, wherein the step of executing each subquery that is directed against a database further comprises the step of retrieving data based on a timestamp of the data.

11. The method of claim 10, further comprising the step of identifying data that does not qualify for retrieval based on the timestamp of the data.

12. The method of claim 10, further comprising the step of identifying objects deleted in the database that are in the object cache based on the timestamp of the data.

13. An apparatus for executing an object-oriented query, comprising:
  a computer having a data storage device connected thereto, wherein the data storage device stores a database;
  one or more computer programs, performed by the computer, for transforming the object-oriented query into subqueries, wherein at least one subquery is directed against a database, and wherein one subquery is directed against an object cache; executing each subquery that is directed against a database to retrieve data from the database into the object cache, and executing the subquery that is directed against the object cache to retrieve data for the query, wherein the data incorporates updates to the object cache and updates to the database.

14. The apparatus of claim 13, wherein the object-oriented query is executed in an optimistic locking with read committed environment.

15. The apparatus of claim 13, wherein the object-oriented query is executed in a serializable repeatable read environment.

16. The apparatus of claim 13, wherein data in the object cache is updated, further comprising the means for deferring transmission of the updated data to the database.

17. The apparatus of claim 13, further comprising the means for updating the database while the object cache is being modified.

18. The apparatus of claim 13, wherein the subquery that is directed against a database is an object-oriented subquery, further comprising the means for transforming the object-oriented subquery to a database subquery.

19. The apparatus of claim 13, further comprising the means for detecting objects that have been deleted in the database, but that remain in the object cache.

20. The apparatus of claim 13, wherein the database is shared.

21. The apparatus of claim 13, wherein the object cache is shared.

22. The apparatus of claim 13, wherein the means for executing each subquery that is directed against a database further comprises the means for retrieving data based on a timestamp of the data.

23. The apparatus of claim 22, further comprising the means for identifying data that does not qualify for retrieval based on the timestamp of the data.

24. The apparatus of claim 22, further comprising the means for identifying objects deleted in the database that are in the object cache based on the timestamp of the data.

25. An article of manufacture comprising a computer program carrier readable by a computer and embodying one or more instructions executable by the computer to perform method steps for executing an object-oriented query to retrieve data from a database stored on a data storage device connected to the computer, the method comprising the steps of:
  transforming the object-oriented query into subqueries, wherein at least one subquery is directed against a database, and wherein one subquery is directed against an object cache;
  executing each subquery that is directed against a database to retrieve data from the database into the object cache; and
  executing the subquery that is directed against the object cache to retrieve data for the query, wherein the data incorporates updates to the object cache and updates to the database.

26. The article of manufacture of claim 25, wherein the object-oriented query is executed an optimistic locking with read committed environment.

27. The article of manufacture of claim 25, wherein the object-oriented query is executed in a serializable repeatable read environment.

28. The article of manufacture of claim 25, wherein data in the object cache is updated, further comprising the step of deferring transmission of the updated data to the database.

29. The article of manufacture of claim 25, further comprising the step of updating the database while the object cache is being modified.

30. The article of manufacture of claim 25, wherein the subquery that is directed against a database is an object-oriented subquery, further comprising the step of transforming the object-oriented subquery to a database subquery.

31. The article of manufacture of claim 25, further comprising the step of detecting objects that have been deleted in the database, but that remain in the object cache.

32. The article of manufacture of claim 25, wherein the database is shared.

33. The article of manufacture of claim 25, wherein the object cache is shared.

34. The article of manufacture of claim 25, wherein the step of executing each subquery that is directed against a database further comprises the step of retrieving data based on a timestamp of the data.

35. The article of manufacture of claim 34, further comprising the step of identifying data that does not qualify for retrieval based on the timestamp of the data.

36. The article of manufacture of claim 34, further comprising the step of identifying objects deleted in the database that are in the object cache based on the timestamp of the data.

* * * * *